(12) United States Patent
Lee et al.

(10) Patent No.: US 10,652,090 B2
(45) Date of Patent: May 12, 2020

(54) METHOD FOR SELF-CONSTRUCTING A MULTI-HOP STRUCTURED WIRELESS COMMUNICATION NETWORK

(71) Applicant: Seoul National University R&DB Foundation, Seoul (KR)

(72) Inventors: Yong Hwan Lee, Seoul (KR); Jin Seok Han, Gunpo-si (KR); Jae Seok Bang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 3 days.

(21) Appl. No.: 16/027,027

(22) Filed: Jul. 3, 2018

(65) Prior Publication Data
US 2019/0245744 A1    Aug. 8, 2019

(30) Foreign Application Priority Data

Feb. 2, 2018    (KR) .......................... 10-2018-0013531

(51) Int. Cl.
*H04L 12/28*     (2006.01)
*H04L 12/24*     (2006.01)
*H04L 12/44*     (2006.01)
*H04L 12/701*    (2013.01)

(52) U.S. Cl.
CPC .......... *H04L 41/0836* (2013.01); *H04L 12/44* (2013.01); *H04L 41/0672* (2013.01); *H04L 41/0816* (2013.01); *H04L 41/0833* (2013.01); *H04L 45/00* (2013.01)

(58) Field of Classification Search
CPC .. H04L 12/44; H04L 41/0672; H04L 41/0836
See application file for complete search history.

(56) References Cited

U.S. PATENT DOCUMENTS

| | | | | |
|---|---|---|---|---|
| 2005/0283525 A1* | 12/2005 | O'Neal | ............... | H04L 12/1854 709/223 |
| 2009/0216910 A1* | 8/2009 | Duchesneau | ......... | G06F 9/5072 709/250 |

* cited by examiner

*Primary Examiner* — Bo Hui A Zhu
(74) *Attorney, Agent, or Firm* — Novick, Kim & Lee, PLLC; Sang Ho Lee (57) ABSTRACT

Provided is a method for self-constructing a multi-hop cluster-tree structured wireless communication network performed by a terminal device attempts to join a network includes determining at least one parent candidate device, requesting the determined parent candidate devices a network joining, joining the network as a child device based on a decision whether the requested parent candidate device has an address space available for a main transmission link of the terminal device, determining at least one cluster head as reserved parent candidate devices, requesting the determined reserved parent candidate devices a network joining, joining the network as a reserved child device based on a decision whether the requested reserved parent candidate device has an address space available for a reserved transmission link of the terminal device, and constructing a new main transmission link when the terminal device determines that the main transmission link is in an abnormal condition.

20 Claims, 6 Drawing Sheets

METHOD FOR SELF-CONSTRUCTING A MULTI-HOP STRUCTURED WIRELESS COMMUNICATION NETWORK

CROSS-REFERENCE TO RELATED APPLICATIONS

A claim for priority under 35 U.S.C. § 119 is made to Korean Patent Application No. 10-2018-0013531 filed on Feb. 2, 2018, in the Korean Intellectual Property Office, the entire contents of which are hereby incorporated by reference.

BACKGROUND

Embodiments of the inventive concept described herein relate to a method for self-constructing a wireless communication network, and more particularly, relate to a method for self-constructing multi-hop cluster-tree structured wireless network.

Recently, with the development of Micro Electro Mechanical System (MEMS) based sensor technology, low-power analog and digital electronic technology, low-power radio frequency (RF) design technology, and the like, wireless sensor networks (WSN) technology using low-cost/low-power wireless sensors have been actively developed.

WSN may be composed of one access point (AP) which is a device for controlling to operate a network and a plurality of sensor nodes (terminal devices having sensing, computing, and communication functions). As the sensor nodes have a limited available power and have a limited communication distance, it is inevitable that an AP and sensor nodes are connected by a multi-hop network to construct a large-scale WSN using low-power sensor nodes. When the WSN is constructed by the multi-hop network, the following problems should be considered.

First, sensors nodes, each of which uses a power of a battery having a limited capacity, should be able to perform self-construction of a network using a few message exchanges and a little power. Self-construction of the WSN may refer to allocating a unique address to each sensor node and constructing transmission links with an AP. Second, sensor nodes should be able to maintain network connectivity by minimally consuming energy and quickly performing self-healing when damage of transmission links occurs due to a change in link condition, exhaustion of a battery of a sensor node, or a change in a location of the sensor node.

SUMMARY

Embodiments of the inventive concept provide a method for self-constructing a wireless network to effectively recover a damaged network when a transmission link is in an abnormal condition due to a change in network operation environment by constructing a main transmission link usually used to transmit data between a parent device and a child device and a reserved transmission link to replace a damaged main transmission link when the main transmission link is damaged in constructing a multi-hop cluster-tree structured wireless network.

Embodiments of the inventive concept provide a method for self-constructing a multi-hop cluster-tree structured wireless network to considerably reduce a time taken to recover a damaged network and may greatly reduce power consumed to recover the damaged network by failing to perform an operation of transmitting and receiving a signal with a plurality of unspecific new devices upon a network change since each of terminal devices constructs a main transmission link and a reserved transmission link.

According to an aspect of an embodiment, a method for self-constructing a cluster-tree structured wireless network may include determining, by a terminal device that attempts to join a network, at least one parent candidate device that can provide the terminal device a main transmission link, requesting, by the terminal device, one of the determined parent candidate devices a network joining, joining, by the terminal device, the network as a child device of the requested parent candidate device based on a decision whether the requested parent candidate device has an address space available for a main transmission link of the terminal device, determining, by the terminal device, at least one cluster head (CH) other than the parent device as reserved parent candidate devices after receiving a command that requests the terminal device to construct a reserved transmission link, the command being transmitted from a coordinator that manages network operation at the highest priority, requesting, by the terminal device, one of the determined reserved parent candidate devices a network joining to construct a reserved transmission link, joining, by the terminal device, the network as a reserved child device of the requested reserved parent candidate device based on a decision whether the requested reserved parent candidate device has an address space available for a reserved transmission link of the terminal device, and constructing, by the terminal device, a new main transmission link by requesting the reserved parent device to convert the reserved transmission link to a main transmission link of the terminal device, when the terminal device determines that the main transmission link is in an abnormal condition.

In an embodiment, the determining of the at least one parent candidate device that can construct a main transmission link by the terminal device may include receiving, by the terminal device, beacon signal including information on an available address space and a network depth of each corresponding CH, the beacon signal being transmitted from adjacent CHs, determining, by the terminal device, CHs that have an available address space larger than or equal to an address space required for the construction of a main transmission link of the terminal device and have a transmission link condition better than a predetermined reference level, as a set of parent candidate devices based on the received beacon signal, and determining, by the terminal device, a parent candidate device in the determined set of parent candidate devices based on the network depth and the transmission link condition of the parent candidate devices.

In an embodiment, the method may further include, after the terminal device requests the determined parent candidate device a network joining, receiving, by the terminal device, a 'network joining permission' message that includes a 'joining permission' or a 'joining denial' information, the 'network joining permission' message being transmitted from the determined parent candidate device, and transmitting, by the terminal device, the coordinator via the parent device a 'network joining completion' message that includes information on an identification data of the terminal device and an address of the main transmission link, after the terminal device receives a 'network joining permission' message that includes a 'joining permission' information, the 'network joining permission' message being transmitted from the determined parent candidate device.

In an embodiment, the method may further include, after the terminal device receives a 'network joining permission' message that includes a 'joining denial' information, determining, by the terminal device, a parent candidate device in the set of parent candidate devices excluding a parent candidate device that transmitted a 'network joining permission' message that includes a 'joining denial' information, and requesting, by the terminal device, the determined parent candidate device a network joining to construct a main transmission link of the terminal device.

In an embodiment, the determining of at least one CH other than the parent device as the reserved parent candidate devices by the terminal device may include receiving, by the terminal device, a beacon signal that includes information on an available address space and a network depth of corresponding CH, the beacon signal being transmitted from adjacent CHs other than the parent device of the terminal device, determining, by the terminal device, CHs that have an available address space larger than or equal to the address space required for the construction of a reserved transmission link of the terminal device and have a transmission link condition better than a predetermined reference level, as a set of reserved parent candidate devices based on the received beacon signal, and determining, by the terminal device, a reserved parent candidate device in the determined set of reserved parent candidate devices based on the network depth and the transmission link condition of the reserved parent candidate devices.

In an embodiment, the size of an address space required for the construction of a reserved transmission link of the terminal device, is larger than or equal to the address space required for the construction of main transmission links of the terminal device and all devices that belong to the cluster network of the terminal device.

In an embodiment, the constructing a new main transmission link by the terminal device comprises, requesting, by the terminal device, the reserved parent device to convert the reserved transmission link to a main transmission link of the terminal device, after the reserved parent device converts the address space allocated to the reserved transmission link of the terminal device to the address space for a main transmission link of the terminal device and accepts the terminal device as a new child device, constructing, by the terminal device, the new main transmission link with the new parent device, determining, by the terminal device, a new reserved parent candidate device, and joining, by the terminal device, the network as a reserved child device of the new reserved parent device.

According to various embodiments, the method may further include confirming, by the terminal device, whether a signal transmission/reception with the parent device has been made within a predetermined time, and when no signal transmission/reception with the parent device has been made within the predetermined time, transmitting, by the terminal device, the parent device a signal notifying that the main transmission link is in a normal condition.

In an embodiment, the determining of the terminal device that the main transmission link constructed between the terminal device and the parent device of the terminal device is in an abnormal condition may include, when the terminal device consecutively fails to make communications with the parent device more than a predetermined number of times, the terminal device experiences communication performance with the parent device worse than a predetermined reference level, the terminal device consecutively does not receive a beacon signal transmitted from the parent device more than a predetermined number of times, or the terminal device receives a 'network re-joining' command transmitted from the parent device, determining, by the terminal device, that the main transmission link with the parent device is in an abnormal condition.

According to various embodiments, the method may further include periodically transmitting, by the terminal device, the reserved parent device a signal notifying that the reserved transmission link is in a normal condition at a predetermined period of time.

According to various embodiments, the method may further include, when the terminal device consecutively fails to make communications with the reserved parent device more than a predetermined number of times, determining, by the terminal device, new reserved parent candidate devices and a new reserved parent device among the new reserved parent candidate devices.

In an embodiment, the requesting the reserved parent device of the terminal device to convert the reserved transmission link to a main transmission link by the terminal device may comprise, determining, by the terminal device, child devices of the terminal device, that make the conversion of the main transmission link together, based on a maximum depth of the network, a network depth of the parent device and a network depth of the reserved parent device.

In an embodiment, the determining of the child devices of the terminal device, that make the conversion of the main transmission link together, by the terminal device may include steps of as follows. It is assumed that $L_{max}$ denotes a maximum network depth, $L_{main}$ denotes a network depth of the parent device, and $L_{rsv}$ denotes a network depth of the reserved parent device, where $0 \le L_{main} < L_{max}$ and $0 \le L_{rsv} < L_{max}$. If $L_{rsv} = L_{max} - 1$, the terminal device may request the reserved parent device to convert the reserved transmission link to a main transmission link of the terminal device as a child end device of the reserved parent device without keeping a network structure with the child devices of the terminal device, and transmit all of the child devices of the terminal device a 'network re-joining' command that requests each of the child devices to convert its reserved transmission link to a main transmission link. If $0 \le L_{rsv} < L_{max} - 1$ and $L_{rsv} \le L_{main}$, the terminal device may request the reserved parent device to convert the reserved transmission link to a main transmission link of the terminal device as a child router of the reserved parent device, while keeping the cluster network structure with the child devices of the terminal device without any change. If $0 \le L_{rsv} < L_{max} - 1$ and $L_{rsv} > L_{main}$, the terminal device may request the reserved parent device to convert the reserved transmission link to a main transmission link of the terminal device as a child router of the reserved parent device, while keeping a network structure only with the child end devices of the terminal device, and transmit all of the child routers of the terminal device a 'network re-joining' command that requests each of the child routers to convert its reserved transmission link to a main transmission link.

The method may further include converting, by the terminal device after being a child device of the reserved parent device, the address space for the reserved transmission link to an address space for the main transmission link of the terminal device, and updating, by the terminal device, an address space for the main transmission link of the child devices of the terminal device.

According to another aspect of an embodiment, a method for self-constructing a multi-hop cluster-tree structured wireless network may include dividing, by a CH, an address space allocated to the CH into an address space for main transmission links and an address space for reserved transmission links, determining, by the CH, whether the CH has an address space available for a main transmission link of the requesting terminal device after the CH receives a 'network joining' request as a child device of the CH from a terminal device, constructing, by the CH, a main transmission link of the requesting terminal device, and allowing, by the CH, the requesting terminal device to join the network as a child device of the CH when the CH has an address space available for a main transmission link of the requesting terminal device; determining, by the CH, whether the CH has an address space available for a reserved transmission link of the requesting terminal device after the CH receives a 'network joining' request as a reserved child device from a terminal device that is not a child device of the CH; constructing, by the CH, a reserved transmission link of the requesting terminal device, and allowing, by the CH, the requesting terminal device to join the network as a reserved child device of the CH when the CH has an address space available for a reserved transmission link of the requesting terminal device; and converting, by the CH, the address space allocated to the reserved transmission link of the requesting reserved child device to an address space for a main transmission link of the requesting reserved child device, and converting, by the CH, the reserved child device to a child device of the CH after the CH receives a 'transmission link change' request from a reserved child device of the CH.

According to various embodiments, the method may further include transmitting, by the CH, a 'network joining completion' message that includes information on device identification data and an address space allocated to the main transmission link of the terminal device as a child device of the CH, to the coordinator via the parent device of the CH.

The method may further include transmitting, by the coordinator, all the terminal devices in the wireless network a command that requests each of the terminal devices to construct a reserved transmission link of each of the terminal devices after the coordinator receives the 'network joining completion' message from all the terminal devices in the wireless network or receives no new 'network joining completion' message in a predetermined time interval.

In an embodiment, the method may further include requesting, by the CH, a CH other than the parent device a network joining as a reserved child device after the CH receives a 'reserved transmission link construction' command transmitted from a coordinator.

The method may further include periodically confirming, by the CH, whether a signal transmission/reception between the CH and a child device of the CH has been made at a predetermined period of time, when no signal transmission/reception between the CH and a child device of the CH has consecutively been made more than a predetermined number of times, determining, by the CH, the child device as an orphan device, and converting, by the CH, the address space of the main transmission link of the child device to an address space available for main transmission links of new child devices of the CH, periodically confirming, by the CH, whether a signal transmission/reception between the CH and a reserved child device of the CH has been made at a predetermined period of time, and when no signal transmission/reception between the CH and a reserved child device of the CH has consecutively been made more than a predetermined number of times, determining, by the CH, the reserved child device as an orphan device, and converting, by the CH, the address space of the reserved transmission link of the reserved child device to an address space available for reserved transmission links of new reserved child devices of the CH.

The method may further include broadcasting, by the CH, a beacon signal with cluster networking related information that includes an available address space and a network depth of the CH, and determining, by the terminal devices, a CH to request a network joining as a child device or a reserved child device of the CH based on the received beacon signal.

According to another aspect of an embodiment, a computer-readable storage medium may store a program for causing a computer to execute the method for constructing the wireless network according to various embodiments of the inventive concept.

According to another aspect of an embodiment, a program may be stored in a storage medium to cause a computer to execute the method for constructing the wireless network according to various embodiments of the inventive concept.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, a detailed description will be given in detail of an exemplary embodiment of the inventive concept with reference to the accompanying drawings to clarify the scope and spirit of the inventive concept. In describing the inventive concept, if it is determined that a detailed description of related well-known functions or elements unnecessarily blurs the gist of the inventive concept, the detailed description will be omitted. The same reference numerals and denotations refer to elements having substantially the same function and construction, although they are displayed on another drawing among the accompanying drawings. An apparatus and a method will be described together if needed for convenience of description.

Figure 1A:
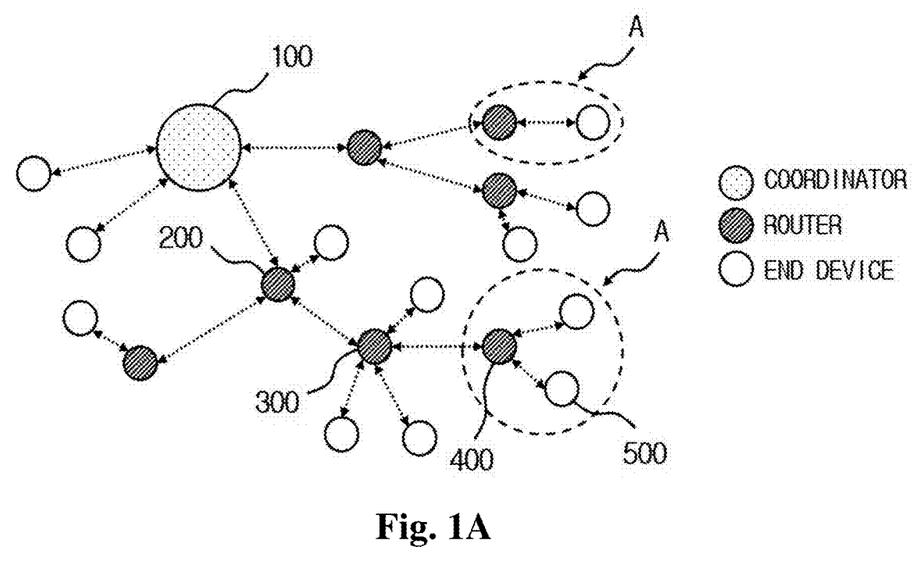
FIGS. 1A and 1B are drawings conceptually illustrating a cluster-tree structured wireless network to which an embodiment of the present invention is applicable.
Figure 1B:
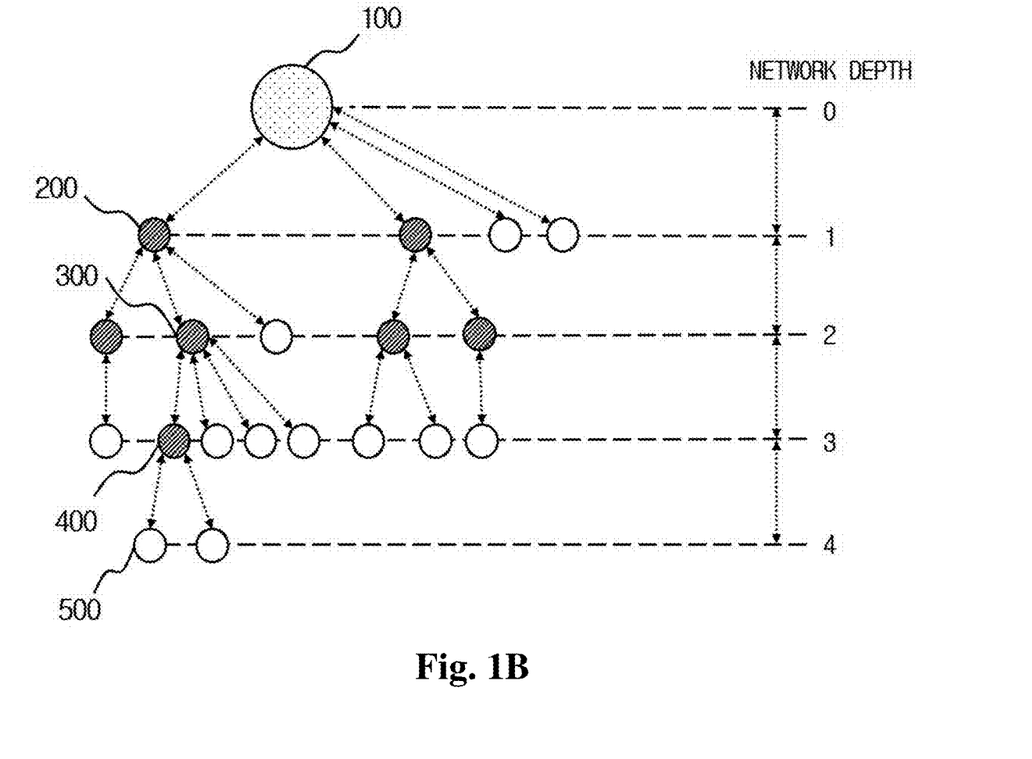

FIGS. 1A and 1B are drawings conceptually illustrating a cluster-tree structured wireless network to which an embodiment of the present invention is applicable. In detail, FIG. 1A is a drawing conceptually illustrating a wireless network in physical aspect. FIG. 1B is a drawing conceptually illustrating a wireless network in logical aspect.

Referring to FIG. 1A, a plurality of terminal device constructing a wireless network may have a relationship between a parent device and a child device. Such a relationship between the parent device and the child device may form a tree structure. Each parent device and each child device may be called in relative terms. For example, with respect to a device 200 constructing the wireless network, the device 200 may be a child device for a terminal 100 of a higher hierarchy than a network depth to which the device 200 belongs and may be a parent device for a device 300 of a lower hierarchy than the network depth to which the device 200 belongs. Further, as the network depth is deeper, the device 200 may be a parent device of each of other devices 400 and 500.

One parent device may be connected with one or more child devices to construct one cluster A. Routers (also called "cluster heads (CHs)") constructing a plurality of clusters (a coordinator as well as the routers may be called a CH) may have a parent-child device relationship and may form a cluster-tree structured wireless network where a plurality of clusters have a tree structure. In addition, a plurality of routers is included in the wireless network, it may refer to a multi-hop cluster-tree structured wireless network.

An uppermost parent device that manages network operation at the highest priority may be called an access point (AP) or a coordinator. A device, referred to a router, may be one of a parent device and a child device. A device, referred to an end device, cannot have its child device and may function as only a child device.

The network depth may be understood as the concept dividing an upper hierarchy and a lower hierarchy of a tree structured network.

ZigBee which is a representative WSN system may construct a cluster-tree structured network using a distributed method of reducing signaling overhead of a network construction process. Before constructing a network, all devices may share information associated with the maximum number Cm of predetermined child devices, the maximum number Rm of child routers, and a network depth Lm. Each router may be allocated Cm independent available addresses from a parent device, may allocate Rm of the Cm independent available addresses to its child routers, and may allocate the rest (Cm−Rm) to its end devices which do not have a routing function. Each device may determine a parent candidate device among routers around it within a communicable range and may request one of the determined parent candidate device to accept to be joined as a router. When declined to be joined from all the parent candidate device, each terminal device may request to accept to be joined as an end device again.

When the router requested as the parent candidate device has an address space available for being allocated to a type of device (i.e., a router or an end device) which requests the router to accept to be joined, it may allocate the address space to the device on a first-come first-served (FCFS) basis and may accept the device to be joined its child device. In this case, since the router determines whether to allow a request to accept to be joined from a new device and allocates an address space to the new device, it may considerably reduce a network joining time and the number of message exchange as compared with a centralized network construction scheme. Since the router is able to use tree routing using a characteristic of an address structure, there is no need to separately search for a transmission link or manage a routing table.

However, each device may request all adjacent parent candidate devices around it to accept to be joined as routers until denied being joined from all the adjacent parent candidate devices, and the router determined as the parent candidate device may accept a request to be joined on a FCFS basis. Thus, since the router determined as the parent candidate device inefficiently has a higher network depth than a real distance from a coordinator, it may be difficult to expand a network further. There is a limitation in self-constructing a large-scale network.

Further, when a connection between a child device and a parent device is damaged, since ZigBee performs a process of joining the network again to construct a new transmission link, a connection recovery time may become very long, and energy consumption may be increased. ZigBee does not cope effectively with network damage which occurs frequently in a real operation environment, and a network lifetime may be shortened.

ZigBee Pro may ensure that all devices in the entire address space join a network using a centralized probabilistic address allocation scheme. However, as a network scale get large, since a probability that an address will be repeatedly used is more increased, a message exchange load associated with address allocation may be greatly increased and a time taken to ensure independence of an address may become longer. Further, mesh networking technology may be used to eliminate the single point of failure problem of a cluster-tree structured network. However, since router devices are always operated for mesh routing management, it is difficult to apply the mesh networking technology to a wireless sensor network environment which uses a low-power sensor node based on a battery.

Z-Wave is mesh networking technology developed for the purpose of home automation. However, Z-Wave supports manual network construction of taking and registering a controller which is a main communication device near a corresponding device and designating a transmission link to allow devices to join a network. Thus, it is difficult to apply Z-Wave to constructing a large-scale wireless sensor network.

Routing protocols for low-power & lossy networks (RPL) supports autonomous network construction of devices. However, since the RPL allocates an address on a centralized basis, each device is essential to exchange a multi-hop message with a coordinator when joining a network. Thus, a message exchange burden may become larger and a network joining time may be considerably increased.

As described above, the network is currently being deployed in a centralized manner, and power is supplied for mesh networking by using routers, or the mesh routing link is determined in a centralized manner. Therefore, it is difficult to apply such a scheme to a large-scale network construction using low-cost/low-power communication devices.

The inventive concept relates to a method for self-constructing a multi-hop cluster-tree structured wireless network in an autonomous manner. A parent device capable of having a child device may divide and manage an address space for main transmission links and an address space for reserved transmission links and may allocate the divided address space for main transmission links and the divided address space for reserved transmission links according to a request of each of terminal devices to construct the wireless network. The term "address space" in the specification may refer to a space defining a room of an address corresponding to a physical memory or virtual memory, a register, a network host, a peripheral device, a disc sector, or another logical or physical entity.

Thus, since a parent-child relationship between devices is implemented with a main transmission link and a reserved transmission link, the inventive concept may safely operate a wireless network by immediately replacing the main transmission link with the reserved transmission link and newly constructing a main transmission link when the main transmission link is damaged. Further, the inventive concept may greatly reduce a time taken to recover damage of a network and power consumed to recover the damage of the network by constructing a new reserved transmission link as the main transmission link is replaced with the reserved transmission link.

Figure 2:
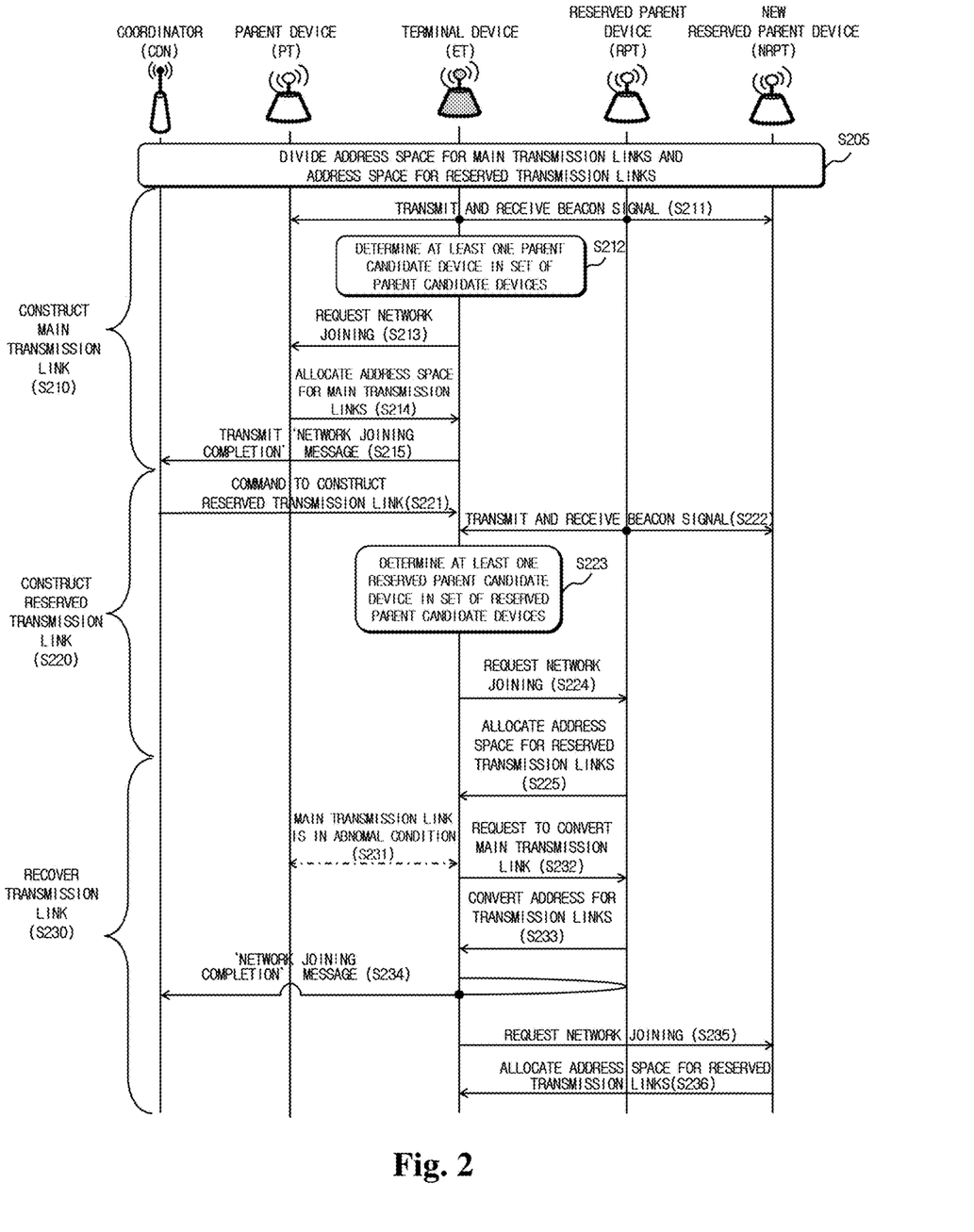
FIG. 2 is a sequence diagram illustrating a method for self-constructing a multi-hop cluster-tree structured wireless network according to an embodiment of the inventive concept.

FIG. 2 is a sequence diagram illustrating a method for self-constructing a multi-hop cluster-tree structured wireless network according to an embodiment of the inventive concept.

Referring to FIG. 2, the method for self-constructing the multi-hop cluster-tree structured wireless network may be performed by a coordinator CDN, a parent device PT, a terminal device ET, a reserved parent device RPT, and a new reserved parent device NRPT. Herein, the coordinator CDN may have the lowest network depth. A network depth among the parent device PT, the reserved parent device RPT, and the new reserved parent device NRPT and a network depth of the terminal device ET which constructs the wireless network with the parent device PT, the reserved parent device RPT, and the new reserved parent device NRPT may differ from each other according to whether the terminal device ET forms a parent-child relationship with any parent device. All the parent device PT, the reserved parent device RPT, and the new reserved parent device NRPT may be routers capable of having their child devices and may correspond to cluster heads (CHs). The terminal device ET may have or fail to have a routing function. In FIG. 2, respective titles of parent devices are used to describe a parent-child relationship constructed between the terminal device ET and the parent devices but have the relative concept. Each of the parent devices PT, RPT, and NRPT used herein may correspond to an absolute CH.

In operation S205, an address space for transmission links, capable of being used by the parent devices PT, RPT, and NRPT, may be divided into an address space for main transmission links and an address space for reserved transmission links. The dividing of the address space for transmission links may be performed by the parent devices PT, RPT, and NRPT or the coordinator CDN. The divided address space for main transmission links and the divided address space for reserved transmission links may be transmitted to the parent devices PT, RPT, and NRPT. All the parent devices PT, RPT, and NRPT excluding the coordinator CDN may divide and manage the address space for main transmission links and the address space for reserved transmission links.

According to an embodiment, the address space for main transmission links and the address space for reserved transmission links may be divided according to a network application environment not to be repeated with each other.

The method for constructing the wireless network according to an embodiment of the present disclosure may be divided into constructing a main transmission link using the divided address space for main transmission links (operation S210,) constructing a reserved transmission link when the construction of the main transmission link is completed (operation S220,) and recovering the constructed transmission link when the constructed transmission link is determined in an abnormal condition, that is, constructing a new main transmission link (operation S230.)

A description will be first given of constructing the main transmission link in the method for self-constructing the multi-hop cluster-tree structured wireless network according to an embodiment of the present disclosure.

Each of the parent devices PT, RPT, and NRPT may broadcast a beacon signal, which is a synchronization signal including information on a cluster networking environment, including information on an available address space and a network depth of the parent devices PT, RPT, and NRPT, that is, CHs. As shown in FIG. 2, when each of the plurality of parent devices PT, RPT, and NRPT transmits the beacon signal, in operation S211, the terminal device ET may receive the beacon signal from each of CHs adjacent to the terminal device ET, including CHs which become parent devices later. The terminal device ET may determine whether the CHs have an available address space larger than or equal to an address space required for the construction of a main transmission link of the terminal device ET, or have a transmission link condition better than a predetermine reference level.

According to an embodiment, the information on the available address space included in the beacon signal may be represented by quantizing each of the ratio of the total number of addresses for main transmission links to the number of available addresses for main transmission links and the ratio of the total number of addresses for reserved transmission links to the number of available addresses for reserved transmission links to N bits (N is a natural number.)

In operation S212, the terminal device ET may determine a parent candidate device in a set of parent candidate devices based on the received beacon signal. For example, the set of parent candidate devices may include the adjacent CHs such as PT, RPT and NRPT from which the beacon signal is received.

In operation S213, the terminal device ET may request the determined parent candidate device a network joining. Requested to accept to join the network, in operation S214, the parent device PT may determine whether there is an address space for main transmission links available for a main transmission link of the requesting terminal device. That is, the parent device PT may determine whether there is an address space for main transmission links sufficient to allow the terminal device ET to join the network as its child device. According to an embodiment, the parent device PT may determine whether an available address space for main transmission links is larger than or equal to an address space for main transmission links required for the terminal device ET, based on the maximum number of child devices which is preset for the terminal device ET or determining the number of child devices connected to the terminal device ET. In other words, this may correspond to a process of determining, by the parent device PT, whether there is an address space for main transmission links, capable of being allocated to the terminal device ET. For example, the terminal device ET may be allocated an address space for main transmission links, including a plurality of addresses for main transmission links, and may allocate one of the addresses to the terminal device ET and may allocate the other addresses for main transmission links to child devices.

As the terminal device ET is allocated an address space for main transmission links from the parent device PT it joins as the child device, it may transmit a 'network joining completion' message to the coordinator CDN. According to an embodiment, the 'network joining completion' message may include an identification data of the terminal device ET and an address of the constructed main transmission link. The 'network joining completion' message may be transmitted from the terminal device ET to the coordinator CDN via the parent device PT of the terminal device ET.

The coordinator CDN may determine that the construction of the main transmission link is completed when receiving the 'network joining completion' message from all terminal devices in the wireless network. In another embodiment, when the coordinator CDN does not receive the 'network joining completion' message during a predetermined time interval at all, it may determine that network joining is not required any longer to determine that the construction of the main transmission link is completed.

Figure 3:
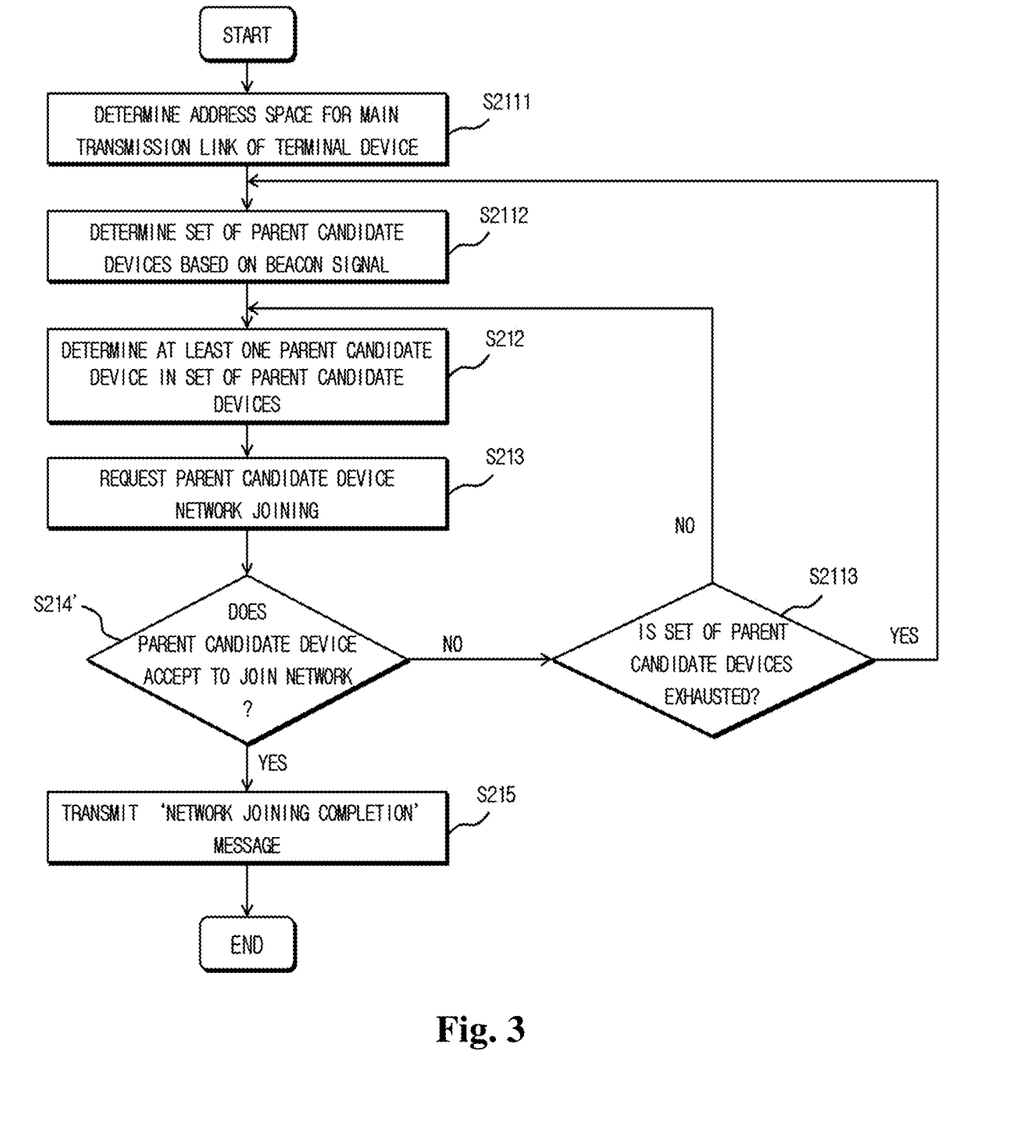
FIG. 3 is a flowchart illustrating an embodiment of a process of constructing a main transmission link.

FIG. 3 is a flowchart illustrating an embodiment of a process of constructing a main transmission link. According to an embodiment, the flowchart of FIG. 3 may be understood as illustrating a detailed process of constructing a main transmission link shown in FIG. 2.

In operation S2111, a terminal device ET of FIG. 2 may determine an address space for main transmission links, required to be allocated to the terminal device ET. According to an embodiment, an address space for main transmission links, required for the terminal device ET, may vary according to the maximum number of child devices which is preset before a network is constructed for the terminal device ET itself or the number of terminal devices constructing a cluster formed by the terminal device ET and types of the terminal device ET.

In operation S2112, the terminal device ET may determine the set of parent candidate devices based on a beacon signal received from each of CHs adjacent to the terminal device ET. The set of parent candidate devices may include CHs, each of which has an available address space larger than or equal to the address space required for construction of a main transmission link of the terminal device ET and has a transmission link condition better than a predetermined reference level.

In operation S212, the terminal device ET may determine at least one parent candidate device based on a network depth and a transmission link condition of each of the CHs included in the set of parent candidate device. According to an embodiment, the terminal device ET may determine a CH which has the lowest network depth or the best transmission link condition as the parent candidate device. The terminal device ET may assign priority orders to a network depth and a transmission link condition, respectively, or may assign weights for corresponding numeric values to the network depth and the transmission link condition, respectively, to use the priority orders or the weights to determine the parent candidate device.

In operation S213, the terminal device ET may first request the determined parent candidate device a network joining, that is, the terminal device ET may request the determined parent candidate device to accept to join a network.

According to the request of network joining from the terminal device ET, the parent candidate device may determine whether there is an address space available for a main transmission link of the requesting terminal device ET. In other words, the determined parent candidate device may determine whether there is and address space capable of being allocated to the terminal device ET. The determined parent candidate device may transmit a 'network joining permission' message. When the determined parent candidate device approves that the terminal device ET joins the network as its child device, the 'network joining permission' message may include 'joining permission' information and include an address space for main transmission links, allocated to the terminal device ET.

When there is no address space for main transmission links, capable of being allocated to the terminal device ET, or when there is an insufficient address space for main transmission links, the determined parent candidate device may deny joining the network to the terminal device ET. In this case, the determined parent candidate device may transmit the 'network joining permission' message including 'joining denial' information.

When the terminal device ET receives the 'network joining permission' message including 'joining permission' information from the parent candidate device which is requested to accept to join the network in operation S214' (Yes), in operation S215, the terminal device ET may transmit a 'network joining completion' message to a coordinator CDN of FIG. 2. The terminal device ET may be joined as a child device of the requested parent candidate device which approves to join the network, and a CH where the terminal device ET is joined as the child device, that is, the parent candidate device may become a parent device of the terminal device ET.

When the terminal device ET receives the 'network joining permission' message including 'joining denial' information from the parent candidate device which is requested to accept to join the network in operation S214' (No), in operation S2113, the terminal device ET may determine whether the set of parent candidate devices determined in operation S2112 is exhausted. When the set of parent candidate devices is not exhausted in operation S2113 (No), the terminal device ET may repeat the process of determining a new parent candidate device excluding a CH that transmitted the 'network joining permission' message including 'joining denial' information in the set of parent candidate devices and requesting the determined new parent candidate device a network joining to construct a main transmission link of the terminal device ET. For example, such a process may be repeated until the set of parent candidate devices is exhausted.

When the set of parent candidate devices is exhausted in operation S2113 (Yes), the terminal device ET may repeat the process of receiving a beacon signal again from each of CHs adjacent to the terminal device ET and determining CHs that have the available address space larger than or equal to the address space required for the construction of a main transmission link of the terminal device ET and have the transmission link condition better than the predetermined reference level, as a set of parent candidate devices.

The process of determining the set of parent candidate devices again or determining a parent candidate device in the set of parent candidate devices, and requesting the determined parent candidate device the network joining may continue until a main transmission link is constructed.

Referring again to FIG. 2, when it is determined that the main transmission link is constructed with all terminal devices included in the multi-hop cluster-tree structured wireless network, in operation S221, the coordinator CDN may transmit a command to construct a reserved transmission link to start to construct the reserved transmission link, that is, a 'reserved transmission link construction' command, in operation S220. For example, the coordinator CDN may transmit the 'reserved transmission link construction' command when the coordinator CDN receives no new 'network joining completion' message in a predetermined time interval.

The coordinator CDN may instruct the respective of terminal devices ET to construct the reserved transmission link after any time elapses or sequentially. For example, reserved transmission links may be sequentially constructed for terminal devices which form a hierarchical structure, in a manner where the terminal device which completes the construction of the reserved transmission link instructs its child device to construct a reserved transmission link. The coordinator CDN may transmit all the terminal devices in the multi-hop cluster-tree structured wireless network requesting to construct a reserved transmission link.

Receiving the command to construct the reserved transmission link, in other words, the 'reserved transmission link construction' command, from the coordinator CDN, the terminal device ET may determine at least one CH other than the parent device of the terminal device ET as a reserved parent candidate device. In operation S222, the terminal device ET may receive a beacon signal from each of adjacent CHs excluding the parent device where the terminal device ET is joined as the child device. For example, CHs excluding the parent device may correspond to the reserved parent device RPT and the new reserved parent device NRPT shown in FIG. 2. In operation S223, the terminal device ET may determine CHs that have an available address space larger than or equal to the address space required for a construction of a reserved transmission link of the terminal device ET and have a transmission link condition better than a predetermined reference level, as a set of reserved parent candidate devices based on the received beacon signal. The terminal device ET may determine a reserved parent candidate device in the determined set of reserved parent candidate devices based on the network depth and the transmission link condition of the reserved parent candidate devices.

In operation S224, the terminal device ET may request the determined reserved parent candidate device a network joining to construct the reserved transmission link. Requested to accept joining the network on a reserved basis, in operation S225, the reserved parent candidate device may accept joining the network by allocating an address space for reserved transmission links to the terminal device ET. Thus, the terminal device ET may be joined as a reserved child device of the reserved parent candidate device. The requested reserved parent candidate device may determine the network joining based on the size of an address space available for a reserved transmission link of the terminal device ET. The parent device where the terminal device ET is joined as the reserved child device may become the reserved parent device of the terminal device ET.

Figure 4:
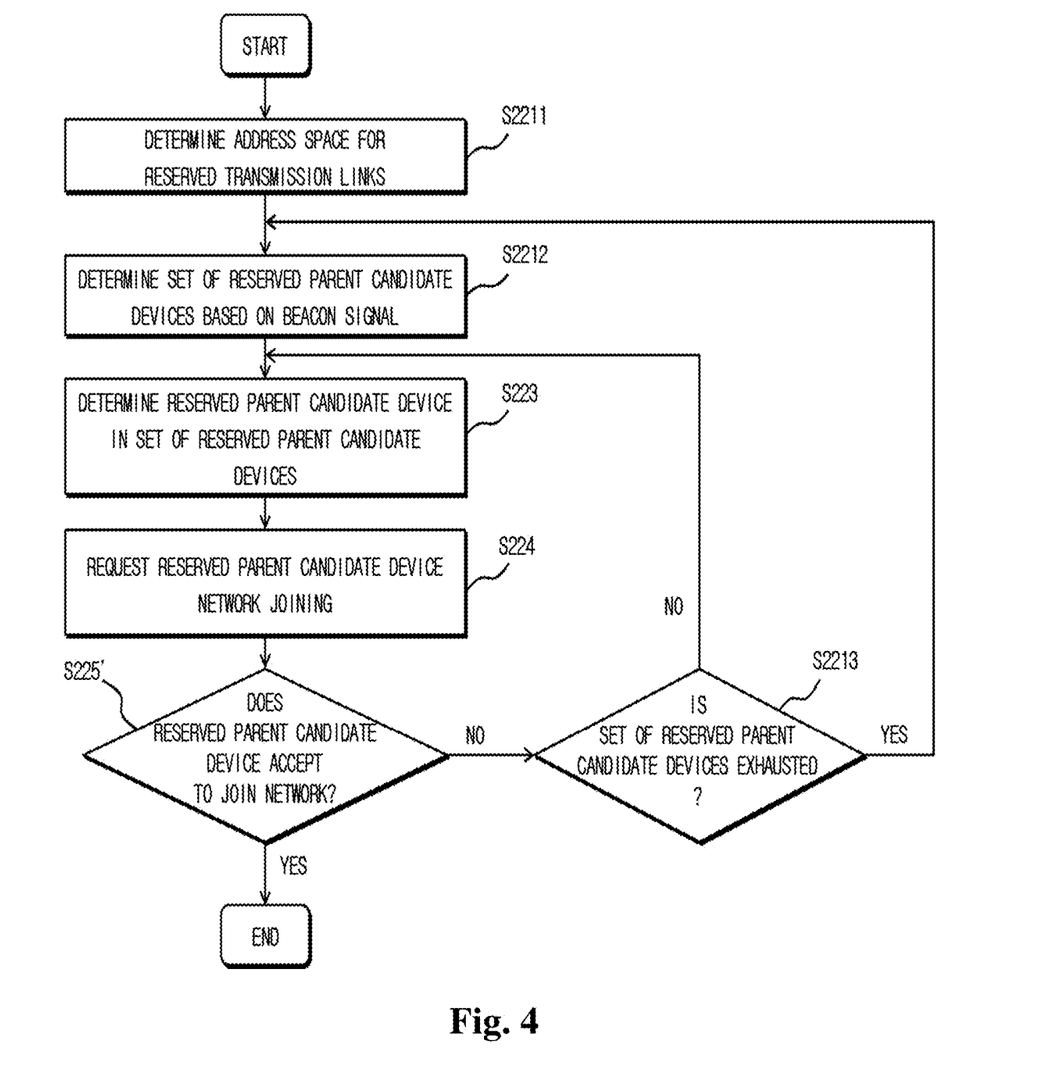
FIG. 4 is a flowchart illustrating an embodiment of a process of constructing a reserved transmission link.

FIG. 4 is a flowchart illustrating an embodiment of a process of constructing a reserved transmission link. Similar to FIG. 3, the flowchart of FIG. 4 may be understood as illustrating a detailed process of constructing a reserved transmission link shown in FIG. 2.

Referring to FIG. 4, in operation S2211, the terminal device ET may determine a size of an address space required for the construction of the reserved transmission link, required for a CH to join a network as a reserved child device. According to an embodiment, the size of an address space for reserved transmission links, necessary for the terminal device ET, may be determined based on the maximum number of child devices of the terminal device ET. The maximum number of child devices of the terminal device ET may be preset for the terminal device ET. In other words, the size of the address space for the reserved transmission links may be determined based on a cluster network of the terminal device ET. According to an embodiment, the number of addresses for reserved transmission links, necessary for the terminal device ET, may be larger than or equal to the address space required for the construction of main transmission links of the terminal device ET and all devices that belong to the cluster network of the terminal device ET.

In operation S2212, the terminal device ET may receive a beacon signal from each of CHs excluding the parent device and may determine a set of reserved parent candidate devices. The terminal device ET may determine the set of reserved parent candidate devices including CHs, each of which has an available address space larger than or equal to the address space required for the construction of a reserved transmission link of the terminal device ET and/or has a transmission link condition better than a predetermined reference level in a similar manner to determine the above-mentioned the set of parent candidate devices.

According to an embodiment, each of the CHs may transmit information, related with its cluster networking, including its network depth and information on an available address space, the information being included in the beacon signal.

In operation S223, the terminal device ET may determine a reserved parent candidate device in the set of reserved parent candidate devices. For example, first, the terminal device ET may determine a CH which has the same network depth as a network depth of a parent device where the terminal device ET is joined as a child device as the reserved parent candidate device. Subsequently, the terminal device ET may determine a CH which has the lowest network depth as the reserved parent candidate device. For example, assuming that the network depth of the parent device where the terminal device ET is joined as the child device is 2, that network depths of CHs of A, B, C, and D included in the set of reserved parent candidate devices are 1, 2, 3, and 4, respectively, and that transmission link conditions of the CHs included in the set of reserved parent candidate devices are the same as each other. In this case, the terminal device ET may first determine CH of B, which has the same network depth as the parent device, as a reserved parent candidate device and may subsequently determine a reserved parent candidate device in an order of CHs of A, C, and D which have low network depths.

In another embodiment, the terminal device ET may determine a CH, which has the best transmission link condition, as a reserved parent candidate device. The terminal device ET may assign priority orders to a network depth and a transmission link condition, respectively, to use the priority orders as a criterion of determining a reserved parent candidate device and may assign weights for numeric values to the network depth and the transmission link condition to use the weights as a criterion of determining a reserved parent candidate device.

In operation S224, the terminal device ET may request the determined reserved parent candidate device the network joining. Requested to accept to join the network from the terminal device ET, the determined reserved parent candidate device may determine whether there is an address space for reserved transmission links, larger than or equal to the address space required for the construction of the reserved transmission link of the terminal device ET, to accept the terminal device ET to join the network as a reserved child device.

The process of accepting, by the reserved parent candidate device, the terminal device ET to join the network as the reserved child device may include transmitting, by the reserved parent candidate device, a 'network joining permission' message that includes 'joining permission' information including an address space for reserved transmission link, allocated to the terminal device ET. The determined parent candidate device may transmit a 'network joining permission' message including 'joining denial' information when there is no address space available for the reserved network link of the terminal device ET.

When receiving the 'network joining permission' message that includes 'joining permission' information from the reserved parent candidate device, that is, when the reserved parent candidate device accepts to join the network in operation S225' (Yes), the terminal device ET may start to operate as the reserved child device of the reserved parent device and may complete the construction of the reserved transmission link. The reserved parent candidate device accepting the request from the terminal device ET to join the network may be referred to a reserved parent device RPT.

According to an embodiment, the terminal device ET may join the network as a reserved child device for a plurality of CHs. In this case, although the terminal device ET completes joining the network as the reserved child device for one reserved parent device, it may determine another reserved parent candidate device and may request the determined another reserved parent candidate device a network joining to accept to join the network.

When the requested reserved parent candidate device deny to join the network, that is, when the terminal device ET receives 'network joining permission' message including 'joining denial' information in operation S225' (No), the terminal device ET may repeat the process of determining still another reserved parent candidate device excluding a CH which denies to join the network from the set of reserved parent candidate devices and requesting the determined still another reserved parent candidate device a network joining. Such a process may be repeated until the terminal device ET joins the network as the reserved child device for the reserved parent candidate device or until the set of reserved parent candidate devices is exhausted.

When the set of reserved parent candidate devices is exhausted in operation S2213 (Yes), the terminal device ET may repeat the process of receiving a beacon signal again transmitted from adjacent CHs and determining a set of reserved parent candidate devices. According to an embodiment, to reduce loss of energy according to repeated construction of reserved transmission links, the terminal device ET may determine a set of reserved parent candidate devices after a predetermined time interval elapses.

As such, when all the main transmission links and the reserved transmission links are constructed, the construction of the multi-hop cluster-tree structured wireless network may be completed to start to perform networking. According to an embodiment of the present disclosure, it may be continuously managed that a transmission link between a parent device and a child device is kept in normal condition in a wireless networking process. Meanwhile, since an address space for main transmission links and an address space for reserved transmission links, allocated to a parent device (CH) having its child device, are limited, there may be a need for efficiently managing such address spaces for transmission links.

According to an embodiment, a parent device (CH) may confirm whether a signal is transmitted and received with its child device at a predetermined period of time $T_{main}$. When no signal transmission/reception between the parent device and a child device of the parent device has consecutively been made more than a predetermined number of times $N_{main}$, the parent device may recognize the child device as an orphan device and may convert the address space for main transmission links for the child device to an address space available for main transmission links of new child devices of the parent device. Further, the parent device may report the child device as the orphan device to the coordinator CDN of FIG. 2.

A child device (terminal device ET may correspond to the child device in view of the parent device PT, reserved parent device RPT, and new reserved parent device NRPT of FIG. 2, of course, the terminal device ET may become a parent device) may confirm whether a signal is transmitted and received with its parent device within a predetermined period $T_{main}^{child}$. When the signal is not transmitted and received with the parent device within the predetermined period $T_{main}^{child}$, the child device may transmit a signal to the parent device to notify the parent device that a state of its main transmission link is in a normal condition. In this case, since it is sufficient to notify the parent device that the condition of the main transmission link between the child device and the parent device is in the normal condition, the signal transmitted to the parent device by the child device may be a signal, such as a null packet, which does not include specific information. The child device may prevent the address space for main transmission links, allocated to the child device, from being determined as address space available for another terminal device, through such periodical signal transmission and reception. Alternatively, when the child device consecutively fails to make communications with the parent device more than a predetermined number of times $N_{main}^{child}$, the child device may determine that the main transmission link with the parent device is in an abnormal condition.

Referring again to FIG. 2, in operation S231, the abnormal condition of the main transmission link, including this case, may be detected in a networking process. When it is determined that the main transmission link is in the abnormal condition, a process of recovering the main transmission link, that is, operation S230, a process of constructing a new main transmission link may be started. In other words, the terminal device ET may start to construct a new main transmission link with a new parent device.

The terminal device ET may determine that the main transmission link with the current parent device is in the abnormal condition when the terminal device ET experiences communication performance with the parent device worse than a predetermined reference level. For example, when the terminal device ET consecutively does not receive at least one of data or a beacon signal to be transmitted and received with the parent device PT more than a predetermined number of times $N_{main}^{child}$, or when a buffer status and a transmission delay are poor, or when the terminal device ET receives a command to join the network again, that is, a 'network re-joining' command, transmitted from the parent device PT, or when performance of transmitting and receiving a signal with the parent device PT is worse than the predetermined reference level, in operation S232, the terminal device ET may determine that the main transmission link with the parent device is in the abnormal condition and may transmit request the reserved parent device RPT to accept to join the network, that is the reserved parent device RPT may convert address space for the reserved transmission link to a main transmission link of the terminal device. For example, the terminal device ET may transmit a 'transmission link change' request to the reserved parent device RPT.

As described above, when the terminal device ET transmits a signal notifying that its main transmission link is in a normal condition to the parent device PT, but when the signal fails to be transmitted to or received by the parent device consecutively more than a predetermined number of times $N_{main}^{child}$, the terminal device ET may stop operating as a child device for the parent device PT and may request the reserved parent device RPT to convert a reserved transmission link to a main transmission link. When there is no reserved parent device RPT where the terminal device ET is joined as a reserved child device, the terminal device ET may perform the process of constructing the main transmission link again (operation S210.)

When receiving the request to convert the reserved transmission link to the main transmission link, in operation S233, the reserved parent device RPT may convert an address space allocated to the reserved transmission links of the terminal device ET, to an address space for a main transmission link of the terminal device ET and may provide the converted address space to the terminal device ET.

According to an embodiment, the reserved parent device RPT may convert an address space allocated to the reserved transmission link of the terminal device ET, to an address space allocated to the main transmission link of the terminal device ET and may construct a main transmission link to accept the terminal device ET to join the network as its child device.

Newly constructing the main transmission link with the reserved parent device RPT, the terminal device ET may convert an address space for reserved transmission link, allocated from a reserved parent device RPT, to an address space for main transmission link and may convert the reserved parent device to a parent device, that is, the new parent device. Such a process may be accomplished by converting, by the terminal device ET, the address for reserved transmission link of the terminal device ET, to the address for main transmission link, and updating address for reserved transmission link allocated to one or more child device of the terminal device ET to address for main transmission link.

In operation S234, the terminal device ET may transmit a 'network joining completion' message indicating that the main transmission link is normally recovered to the coordinator CDN via the reserved parent device RPT of the terminal device ET.

Replacing the main transmission link with the previous reserved transmission link, the terminal device ET may need to scan a new reserved parent device and construct a new reserved transmission link. According to an embodiment, in a similar manner to operation S220 of constructing the reserved transmission link, in operation S235, the terminal device ET may determine new CHs, excluding the reserved parent device RPT which newly become a parent device, as new reserved parent candidate devices and may request the determined new reserved parent candidate devices a network joining. Thus, in operation S236, the terminal device ET may be allocated an address space for reserved transmission links from the new reserved parent device NRPT.

Newly requesting to construct a reserved transmission link, the new reserved parent device NRPT may be determined as the terminal device ET receives a beacon signal from each of CHs, determines a set of reserved parent candidate devices, and determines a reserved parent candidate device in the same manner as the process of constructing the reserved transmission link. However, as described above, when the terminal device ET manages a plurality of reserved parent devices described in operation S220 of constructing the reserved transmission link, such a scan process may not be required.

According to an embodiment, an address space for reserved transmission links of a parent device may be managed in a similar manner to an address space for main transmission links. A reserved parent device may confirm whether a signal is transmitted or received with a reserved child device at a predetermined period of time $T_{reserved}$. When it is determined that the signal is not transmitted or received with the reserved child device consecutively more than a predetermined number of times $N_{reserved}$, the reserved parent device may determine the reserved child device as an orphan device and may collect an address space for reserved transmission links, allocated to the reserved child device, as an address space available for reserved transmission links of new reserved child device of the reserved parent device.

The reserved child device may transmit a signal notifying that the reserved transmission link is in a normal condition to the reserved parent device at a predetermined period of time $T_{reserved}^{child}$. When the signal fails to be transmitted to the reserved parent device consecutively more than a predetermined number of times $N_{reserved}^{child}$, the reserved child device may determine that the reserved transmission link with the reserved parent device is in an abnormal condition, and the reserved child device may stop to operate as the reserved child device for the reserved parent device.

Thus, after a relationship between the reserved parent device and the reserved child device is established, it is determined that the relationship is lost due to a change in condition within a predetermined period of time. If a terminal device ET knows for the first time that a reserved transmission link is unavailable when the terminal device ET try to use the reserved transmission link after the main transmission link is in the abnormal condition, it may be difficult to accomplish the purpose of constructing a main transmission link and a reserved transmission link in advance and immediately convert the reserved transmission link to the main transmission link to recover damaged main transmission link. However, when a reserved transmission link is periodically checked whether the reserved transmission link is in a normal condition or not, a possibility that the reserved transmission link will not be used to recover a damaged transmission link may be minimized. In other words, when a reserved transmission link recovers a main transmission link which is in an abnormal condition, reliability of the newly constructed reserved transmission link may be ensured. In addition, according to an embodiment of the present disclosure, although there is a limited number of address for reserved transmission links, the address for reserved transmission links may be effectively managed.

Figure 5:
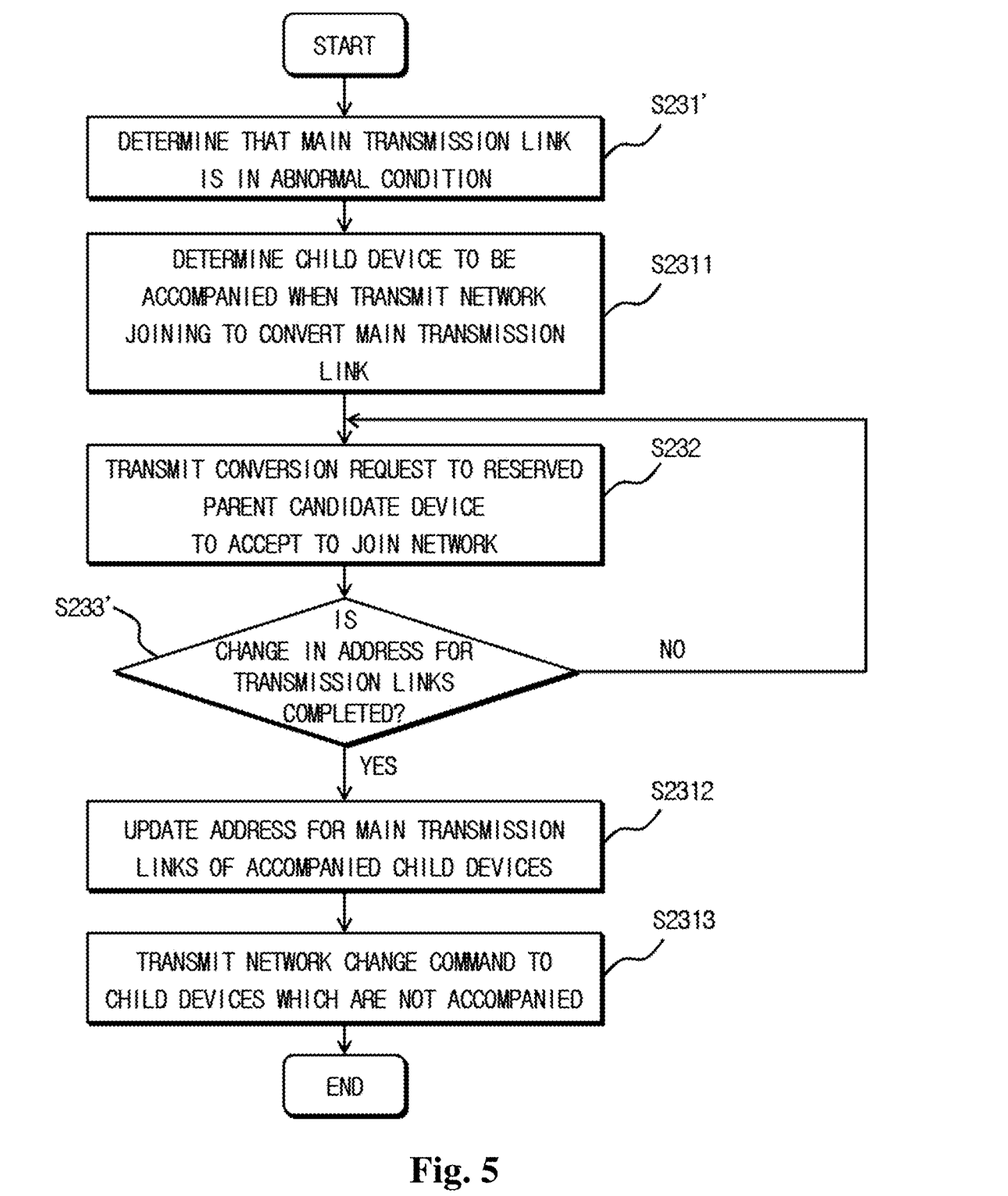
FIG. 5 is a flowchart illustrating a detailed process of recovering a transmission link according to an embodiment of the inventive concept.

FIG. 5 is a flowchart illustrating a detailed process of recovering a transmission link according to an embodiment of the present disclosure.

When a main transmission link is determined to be in an abnormal condition in operation S231', in operation S2311, the terminal device ET of FIG. 2 may determine child devices to be accompanied when transmitting a request of network joining to make conversion of the main transmission link together. For example, the terminal device ET may determine child devices to be accompanied based on at least one of a maximum depth of a total wireless network and a network depth of a reserved parent device which is scheduled to receive the request of network joining to make conversion of the main transmission link together. According to an embodiment, the terminal device ET may determine child devices to be accompanied when the terminal device ET determines a reserved parent device.

In detail, it is assumed that a maximum network depth is $L_{max}$, that a network depth of a parent device where the terminal device ET is joined as a child device is $L_{main}$ ($0 \le L_{main} < L_{max}$), and that a network depth of a reserved parent device where the terminal device ET is joined as a reserved child device is $L_{rsv}$ ($0 \le L_{rsv} < L_{max}$).

If $L_{rsv} = L_{max} - 1$, the terminal device ET may determine that there is no child device to be accompanied, that is, the terminal device ET may be determined as a child end device. If $0 \le L_{rsv} < L_{max} - 1$ and $L_{rsv} \le L_{main}$, the terminal device ET may determine to accompany all of its child devices and keep a cluster network structure without any change. If $0 \le L_{rsv} < L_{max} - 1$ and $L_{rsv} > L_{main}$, the terminal device ET may determine to accompany only the child end devices of the terminal device ET and not to accompany the child routers of the terminal device ET.

Such a determination may be for efficiency of the entire construction of the wireless network. In operation 232, the terminal device ET may transmit a conversion request to a reserved parent device RPT of FIG. 2 to accept for the terminal device ET and the child device determined to be accompanied to join the network.

As described above, the reserved parent device RPT may convert an address space for reserved transmission links of the terminal device ET, to an address space for main transmission links. The terminal device ET may operate as a child device for the reserved parent device RPT as a parent device.

When the conversion in address for transmission links is completed in operation S233' (Yes), in operation S2312, the terminal device ET may update an address for main transmission link of the accompanied child devices. In detail, the terminal device ET may update the address for main transmission links of the accompanied child devices using information on its previous address for main transmission links and information on a currently converted address for main transmission links.

In operation S2313, the terminal device ET may transmit a network change command to child devices which are not accompanied to the terminal device ET itself when the terminal device ET make conversion of the main transmission link. In detail, if $L_{rsv}=L_{max}-1$, since the terminal device ET does not accompany any child device, the terminal device ET may transmit a network change command such as a 'network re-joining' command to all of the child devices of the terminal device ET. Thus, the terminal device ET may be joined as a child end device of the reserved parent device RPT without keeping a network structure with the child devices of the terminal device ET. The 'network re-joining' command requesting each of the child devices to convert its reserved transmission link to a main transmission link is transmitted to all of the child devices of the terminal device ET. The 'network re-joining' command may indicate that the child devices of the terminal device ET to join the network again, may be a signal for notifying the child devices that a main transmission link is in an abnormal condition, for example, notifying the child devices of replacing a main transmission link with a reserved transmission link since the main transmission link is in the abnormal condition.

If $0 \leq L_{rsv} < L_{max}-1$ and $L_{rsv} \leq L_{main}$, since the terminal device ET accompanies all child devices of itself, the network change command may not be transmitted. The terminal device ET may request the reserved parent device RPT to convert the reserved transmission link to a main transmission link of the terminal device ET as a child router of the reserved parent device RPT, while keeping the cluster network structure with the child devices of the terminal device ET without any change. If $0 \leq L_{rsv} < L_{max}-1$ and $L_{rsv} > L_{main}$, the terminal device ET may transmit a 'network re-joining' command to all of the child routers of the terminal device ET. The 'network re-joining' command requests each of the child router device of the terminal device ET to convert its reserved transmission link to a main transmission link. The terminal device ET may request the reserved parent device RPT to convert the reserved transmission link to a main transmission link of the terminal device as a child router of the reserved parent device RPT, while keeping a network structure only with the child end devices of the terminal device ET.

According to an embodiment, the terminal device ET may transmit a conversion request to the reserved parent device RPT to accept to join the network, but the reserved parent device RPT may deny converting an address for transmission links in operation S233' (No). When the terminal device ET joins the network for a plurality of reserved parent devices RPT, it may transmit the conversion request to other reserved parent devices to accept to join the network.

According to another embodiment, when the terminal device ET is being denied converting a reserved transmission link to a main transmission link from all reserved parent devices, or when the terminal device ET had joined the network as a reserved child device for only one reserved parent device, the terminal device ET may perform operation S210 of FIG. 2 of constructing the main transmission link from the beginning.

As described above, according to the method for self-constructing the wireless network according to an embodiment, as both of a main transmission link and a reserved transmission link are constructed for a terminal device ET, although the main transmission link is in an abnormal condition, the terminal device ET may replace the main transmission link with the reserved transmission link to immediately construct a new network. This may be understood as immediately recovering a damaged network. Thus, according to the method for constructing the wireless network according to an embodiment, a recovery time of a network or power consumption to recover the network may be minimized.

The above-mentioned method according to an embodiment of the present disclosure may be implemented as a computer-readable code in computer-readable storage medium. The computer-readable storage medium may include all types of physical storage medium such as magnetic storage medium and optical reading medium. A data format of a message used in the inventive concept may be stored in storage medium. A program stored in a medium to execute the method according to an embodiment of the present disclosure may be included in the scope and spirit of the inventive concept. The computer-readable storage medium may be physical medium which store information and may include a volatile memory, a nonvolatile memory, optical reading medium, magnetic disc storage medium, and the like. Various embodiments of the inventive concept may include computer-readable storage medium storing instructions for performing the above-mentioned methods.

An embodiment of the present disclosure may construct a large-scale wireless network by minimizing power used by respective devices in constructing a wireless network and expanding a network irrespective of a distance from an AP.

According to an embodiment of the present disclosure, an AP and routers may be parent devices and may construct a multi-hop cluster-tree structured network depending on a process of receiving a request to join a network from terminal devices and accept to join the network. An embodiment of the present disclosure may extend a network lifetime by minimizing a network construction time as compared with a centralized network construction scheme and recovering network damage during a fast time.

An embodiment of the present disclosure relates to a method for constructing a wireless network to facilitate self-construction to allow a multi-hop cluster-tree structured network have a semi-mesh function. An embodiment of the present disclosure may divide an address space for main transmission links and an address space for reserved transmission links and may construct a main transmission link and a reserved transmission link using the divided address spaces. When determining a disconnection, damage, or failure of a main transmission link, an embodiment of the present disclosure may immediately replace a main transmission link with a reserved transmission link and may perform data transmission seamlessly, thus constructing a new reserved transmission link. Thus, an embodiment of the present disclosure may provide similar performance to a conventional mesh network when a network disconnection problem occurs by maintaining an advantage of a conventional cluster-tree structured network, that is, reducing traffic generated by exchanging control command messages and reducing the burden of scanning a routing link, and minimizing a single point of failure problem of a cluster-tree structured network.

A detailed description is given about exemplary embodiments of the inventive concept shown in the accompanying drawings. Such embodiments are not limited to the inventive concept and are only exemplary and should be considered in illustrative and not restrictive in terms of all aspects. The scope of the inventive concept shall be determined only according to the attached claims, rather than the above description. Although specific terms are used in the specification, such terms used herein are used for the purpose of describing the concept of the inventive concept only and are not used to be limited to the inventive concept or limit the scope of the inventive concept described in the attached claims. Each stage of the inventive concept may be performed in parallel, selectively, or separately without the necessity of performing each stage in a described order. It should be understood to the ordinary skilled person in the art that the inventive concept is intended to cover various modifications and equivalent other embodiments within departing from the spirit and scope of the inventive concept. It should be understood that equivalents include equivalents to be developed in the future as well as currently well-known equivalents, that is, all elements invented to perform the same function irrespective of their structures.

What is claimed is:

1. A method for self-constructing a multi-hop cluster-tree structured wireless communication network, the method comprising:
    determining, by a terminal device that attempts to join a network, at least one parent candidate device that can provide the terminal device a main transmission link;
    requesting, by the terminal device, one of the determined parent candidate devices a network joining;
    joining, by the terminal device, the network as a child device of the requested parent candidate device based on a decision whether the requested parent candidate device has an address space available for the main transmission link of the terminal device;
    determining, by the terminal device, at least one cluster head (CH) other than the parent device as reserved parent candidate devices after receiving a command that requests the terminal device to construct a reserved transmission link, the command being transmitted from a coordinator that manages network operation at a highest priority;
    requesting, by the terminal device, one of the determined reserved parent candidate devices a network joining to construct the reserved transmission link;
    joining, by the terminal device, the network as a reserved child device of the requested reserved parent candidate device based on a decision whether the requested reserved parent candidate device has an address space available for the reserved transmission link of the terminal device; and
    constructing, by the terminal device, a new main transmission link by requesting the reserved parent device to convert the reserved transmission link to the new main transmission link of the terminal device, when the terminal device determines that the main transmission link is in an abnormal condition.

2. The method of claim 1, wherein the determining of at least one parent candidate device that can construct the main transmission link by the terminal device comprises:
    receiving, by the terminal device, a beacon signal that includes information on an available address space and a network depth of corresponding CH, the beacon signal being transmitted from adjacent CHs;
    determining, by the terminal device, CHs that have an available address space larger than or equal to an address space required for the construction of the main transmission link of the terminal device and have a transmission link condition better than a predetermined reference level, as a set of parent candidate devices based on the received beacon signal; and
    determining, by the terminal device, a parent candidate device in the determined set of parent candidate devices based on the network depth and the transmission link condition of the parent candidate devices.

3. The method of claim 2, further comprising:
    after the terminal device requests the determined parent candidate device a network joining,
    receiving, by the terminal device, a 'network joining permission' message that includes a 'joining permission' or a 'joining denial' information, the 'network joining permission' message being transmitted from the determined parent candidate device; and
    transmitting, by the terminal device, the coordinator via the parent device a 'network joining completion' message that includes information on an identification data of the terminal device and the address of the main transmission link, after the terminal device receives a 'network joining permission' message that includes a 'joining permission' information, the 'network joining permission' message being transmitted from the determined parent candidate device.

4. The method of claim 3, further comprising:
    after the terminal device receives a 'network joining permission' message that includes a 'joining denial' information,
    determining, by the terminal device, a parent candidate device in the set of parent candidate devices excluding parent candidate devices that transmitted a 'network joining permission' message that includes a 'joining denial' information; and
    requesting, by the terminal device, the determined parent candidate device a network joining to construct the main transmission link of the terminal device.

5. The method of claim 1, wherein the determining of at least one CH other than the parent device as reserved parent candidate devices by the terminal device comprises:
    receiving, by the terminal device, a beacon signal that includes information on an available address space and a network depth of corresponding CH, the beacon signal being transmitted from adjacent CHs other than the parent device of the terminal device;
    determining, by the terminal device, CHs that have an available address space larger than or equal to an address space required for the construction of the reserved transmission link of the terminal device and have a transmission link condition better than a predetermined reference level, as a set of reserved parent candidate devices based on the received beacon signal; and determining, by the terminal device, a reserved parent candidate device in the determined set of reserved parent candidate devices based on the network depth and the transmission link condition of the reserved parent candidate devices.

6. The method of claim 5, wherein the address space required for the construction of the reserved transmission link of the terminal device, is larger than or equal to the address space required for the construction of main transmission links of the terminal device and all devices that belong to the cluster network of the terminal device.

7. The method of claim 1, wherein the constructing the new main transmission link by the terminal device comprises:

requesting, by the terminal device, the reserved parent device to convert the reserved transmission link to the new main transmission link of the terminal device;

after the reserved parent device converts the address space allocated to the reserved transmission link of the terminal device to the address space for the main transmission link of the terminal device and accepts the terminal device as a new child device;

constructing, by the terminal device, the new main transmission link with the new parent device;

determining, by the terminal device, a new reserved parent candidate device; and joining, by the terminal device, the network as a reserved child device of the new reserved parent device.

8. The method of claim 1, further comprising:

confirming, by the terminal device, whether a signal transmission/reception with the parent device has been made within a predetermined time; and when no signal transmission/reception with the parent device has been made within the predetermined time, transmitting, by the terminal device, the parent device a signal notifying that the main transmission link is in a normal condition.

9. The method of claim 1, wherein the determining by the terminal device that the main transmission link is in an abnormal condition comprises:

when the terminal device consecutively fails to make communications with the parent device more than a predetermined number of times, the terminal device experiences communication performance with the parent device worse than a predetermined reference level, the terminal device consecutively does not receive a beacon signal transmitted from the parent device more than a predetermined number of times, or the terminal device receives a 'network re-joining' command transmitted from the parent device, determining, by the terminal device, that the main transmission link with the parent device is in an abnormal condition.

10. The method of claim 1, further comprising:

periodically transmitting, by the terminal device, the reserved parent device a signal notifying that the reserved transmission link is in a normal condition at a predetermined period of time.

11. The method of claim 10, further comprising:

when the terminal device consecutively fails to make communications with the reserved parent device more than a predetermined number of times, determining, by the terminal device, new reserved parent candidate devices and a new reserved parent device among the new reserved parent candidate devices.

12. The method of claim 1, wherein the requesting the reserved parent device of the terminal device to convert the reserved transmission link to the new main transmission link by the terminal device comprises:

determining, by the terminal device, child devices of the terminal device, that make the conversion of the main transmission link together, based on a maximum depth of the network, a network depth of the parent device and a network depth of the reserved parent device.

13. The method of claim 12, wherein the determining of child devices of the terminal device, that make the conversion of the main transmission link together, by the terminal device comprises:

wherein $L_{max}$ denotes a maximum network depth, $L_{main}$ denotes a network depth of the parent device, and $L_{rsv}$ denotes a network depth of the reserved parent device, where $0 \leq L_{main} < L_{max}$ and $0 \leq L_{rsv} < L_{max}$, when $L_{rsv} = L_{max} - 1$, requesting, by the terminal device, the reserved parent device to convert the reserved transmission link to the new main transmission link of the terminal device as a child end device of the reserved parent device without keeping a network structure with the child devices of the terminal device, and transmitting, by the terminal device, all of the child devices of the terminal device a 'network re-joining' command that requests each of the child devices to convert its reserved transmission link to a main transmission link;

when $0 \leq L_{rsv} < L_{max} - 1$ and $L_{rsv} \leq L_{main}$, requesting, by the terminal device, the reserved parent device to convert the reserved transmission link to the new main transmission link of the terminal device as a child router of the reserved parent device, while keeping the cluster network structure with the child devices of the terminal device without any change; and when $0 \leq L_{rsv} < L_{max} - 1$ and $L_{rsv} > L_{main}$, requesting, by the terminal device, the reserved parent device to convert the reserved transmission link to the new main transmission link of the terminal device as a child router of the reserved parent device, while keeping a network structure only with the child end devices of the terminal device, and transmitting, by the terminal device, all of the child routers of the terminal device a 'network re-joining' command that requests each of the child routers to convert its reserved transmission link to a main transmission link.

14. The method of claim 7, further comprising:

converting, by the terminal device after being a child device of the reserved parent device, the address space for the reserved transmission link to an address space for the new main transmission link of the terminal device, and updating, by the terminal device, an address space for the main transmission link of the child devices of the terminal device.

15. A method for self-constructing a multi-hop cluster-tree structured wireless communication network, the method comprising:

dividing, by a cluster head (CH) an address space allocated to the CH into an address space for main transmission links and an address space for reserved transmission links;

after the CH receives a 'network joining' request as a child device of the CH from a terminal device, determining, by the CH, whether the CH has an address space available for a main transmission link of the requesting terminal device;

when the CH has an address space available for the main transmission link of the requesting terminal device, constructing, by the CH, the main transmission link of the requesting terminal device, and allowing, by the CH, the requesting terminal device to join the network as a child device of the CH;

after the CH receives a 'network joining' request as a reserved child device from a terminal device that is not a child device of the CH, determining, by the CH, whether the CH has an address space available for a reserved transmission link of the requesting terminal device;

when the CH has an address space available for the reserved transmission link of the requesting terminal device, constructing, by the CH, the reserved transmission link of the requesting terminal device, and allowing, by the CH, the requesting terminal device to join the network as a reserved child device of the CH; and after the CH receives a 'transmission link change' request from the reserved child device of the CH, converting, by the CH, the address space allocated to the reserved transmission link of the requesting reserved child device to an address space for a main transmission link of the requesting reserved child device, and converting, by the CH, the reserved child device to a child device of the CH.

16. The method of claim 15, further comprising:

transmitting, by the CH, a 'network joining completion' message that includes information on device identification data and address space allocated to the main transmission link of the terminal device as a child device of the CH, to the coordinator via the parent device of the CH.

17. The method of claim 16, further comprising:

after the coordinator receives the 'network joining completion' message from all the terminal devices in the wireless network or receives no new 'network joining completion' message in a predetermined time interval, transmitting, by the coordinator, all the terminal devices in the wireless network a command that requests each of the terminal devices to construct a reserved transmission link of each of the terminal devices.

18. The method of claim 15, further comprising:

after the CH receives a 'reserved transmission link construction' command transmitted from the coordinator, requesting, by the CH, a CH other than the parent device a network joining as a reserved child device.

19. The method of claim 15, further comprising:

periodically confirming, by the CH, whether a signal transmission/reception between the CH and a child device of the CH has been made at a predetermined period of time;

when no signal transmission/reception between the CH and a child device of the CH has consecutively been made more than a predetermined number of times, determining, by the CH, the child device as an orphan device, and converting, by the CH, the address space of the main transmission link of the child device to an address space available for main transmission links of new child devices of the CH;

periodically confirming, by the CH, whether a signal transmission/reception between the CH and a reserved child device of the CH has been made at a predetermined period of time; and when no signal transmission/reception between the CH and a reserved child device of the CH has consecutively been made more than a predetermined number of times, determining, by the CH, the reserved child device as an orphan device, and converting, by the CH, the address space of the reserved transmission link of the reserved child device to an address space available for reserved transmission links of new reserved child devices of the CH.

20. The method of claim 15, further comprising:

broadcasting, by the CH, a beacon signal with cluster networking related information that includes an available address space and a network depth of the CH, determining, by the terminal devices, a CH to request a network joining as a child device or a reserved child device of the CH based on the received beacon signal.

* * * * *